United States Patent [19]

Micale

[11] Patent Number: 5,586,391
[45] Date of Patent: Dec. 24, 1996

[54] METHOD OF MAKING AIRPLANE FUSELAGE

[75] Inventor: Antonio C. Micale, Seattle, Wash.

[73] Assignee: The Boeing Company, Seattle, Wash.

[21] Appl. No.: 468,217

[22] Filed: Jun. 6, 1995

Related U.S. Application Data

[62] Division of Ser. No. 964,533, Oct. 13, 1992, Pat. No. 5,560,102.

[51] Int. Cl.$^6$ .................................................. B23Q 17/00
[52] U.S. Cl. ................. 29/897.2; 29/407.05; 29/525.06; 244/120
[58] Field of Search ..................... 29/34 B, 56.6, 29/243.53, 243.54, 281.1, 407, 525.2, 557, 558, 559, 564.7, 566, 650, 897, 897.2, 897.32, 407.09, 407.1, 525.06, 407.01, 407.05; 227/51; 408/1 R; 409/131, 132; 364/474.34; 244/119, 120, 126

[56] References Cited

U.S. PATENT DOCUMENTS

| | | |
|---|---|---|
| 2,405,643 | 8/1946 | Crot . |
| 2,420,292 | 5/1947 | Baer et al. .............................. 244/119 |
| 2,675,608 | 4/1954 | Vines et al. . |
| 4,159,573 | 7/1979 | Plihal ....................................... 33/174 |
| 4,230,254 | 10/1980 | Proeschl .................................. 228/182 |
| 4,259,776 | 4/1981 | Roda ........................................ 29/466 |
| 4,590,578 | 5/1986 | Barto, Jr. et al. . |
| 4,662,556 | 5/1987 | Gidlund .................................... 227/69 |
| 4,796,341 | 1/1989 | Kuhn, II . |
| 4,835,359 | 5/1989 | Sciortino ............................ 219/121.69 |
| 4,967,947 | 11/1990 | Sarh . |
| 5,084,951 | 4/1992 | Bonomi .................................... 29/26 A |
| 5,127,139 | 7/1992 | McCowin et al. . |
| 5,165,829 | 11/1992 | Ross ....................................... 409/125 |
| 5,249,785 | 10/1993 | Nelson et al. . |
| 5,312,211 | 5/1994 | Rodriguez . |
| 5,384,950 | 1/1995 | Kallenberger . |

FOREIGN PATENT DOCUMENTS

| | | |
|---|---|---|
| 0338117 | 10/1989 | European Pat. Off. . |
| 3302618 | 8/1984 | Germany . |
| 279260 | 11/1990 | Japan . |
| 5016888 | 1/1993 | Japan . |

*Primary Examiner*—David P. Bryant
*Attorney, Agent, or Firm*—Lawrence W. Nelson; J. Michael Neary

[57] ABSTRACT

A method of making a large airplane structure from a plurality of subassemblies. The method comprises drilling coordination holes in selected components which are made for accurate assembly of the subassemblies, and that will be located on the subassemblies in a position to be used to accurately position the subassemblies relative to each other so the spatial relationships between key features of the subassemblies as defined by the coordination holes make the subassemblies self-locating and intrinsically determinate of the final contour and configuration of the large airplane structure, independent of tooling. The drilling of coordination holes in the selected components is done using an end effector carried by a precision computer controlled robot that is directed to the drilling locations using a digital dataset taken directly from original digital part definition records.

3 Claims, 11 Drawing Sheets

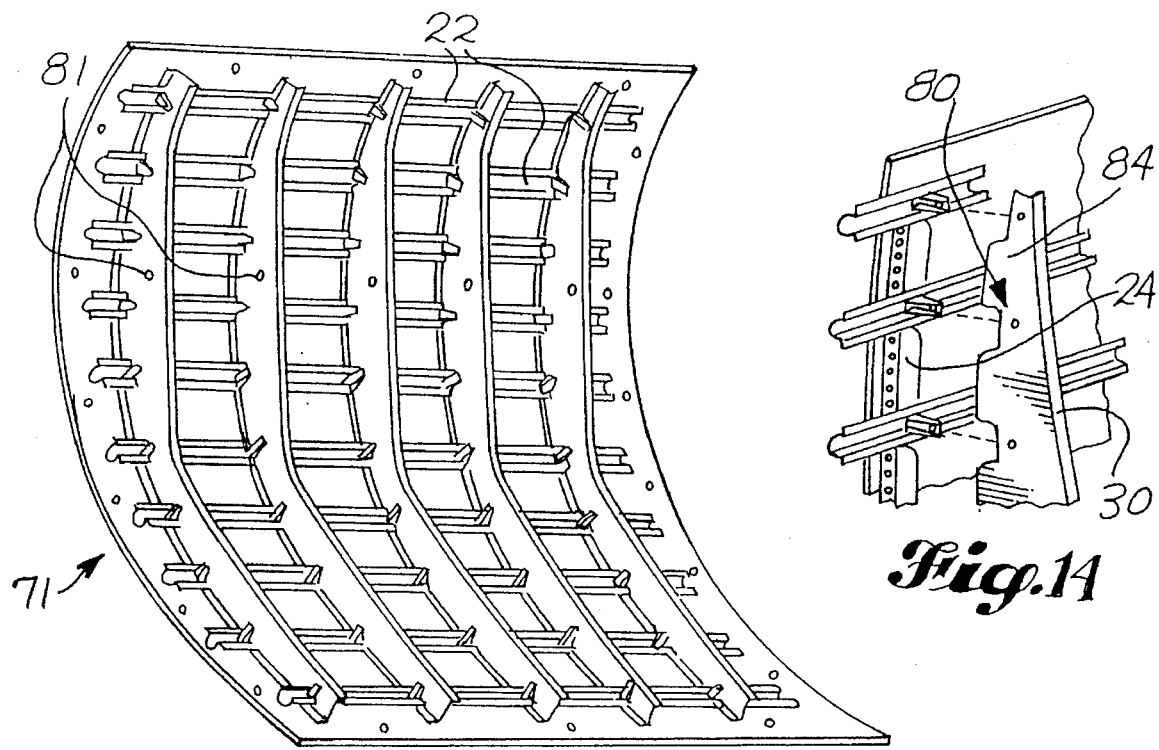
Fig. 14
Fig. 13
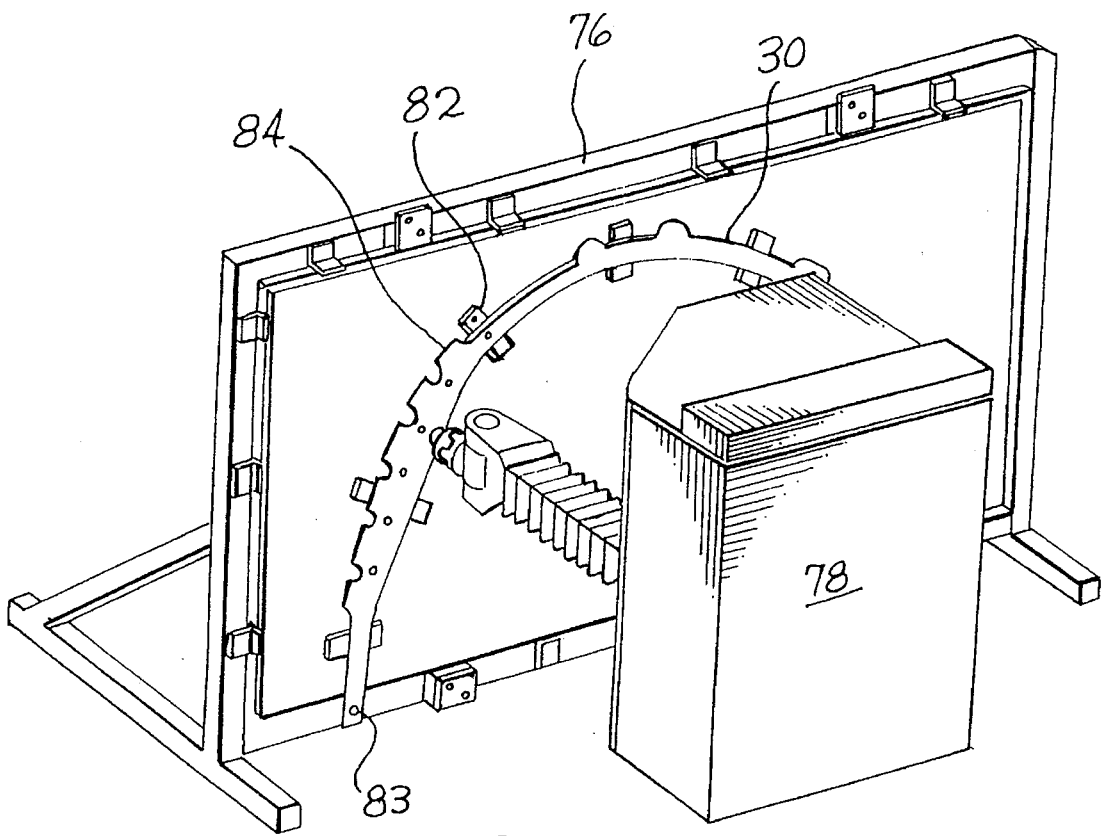
Fig. 12

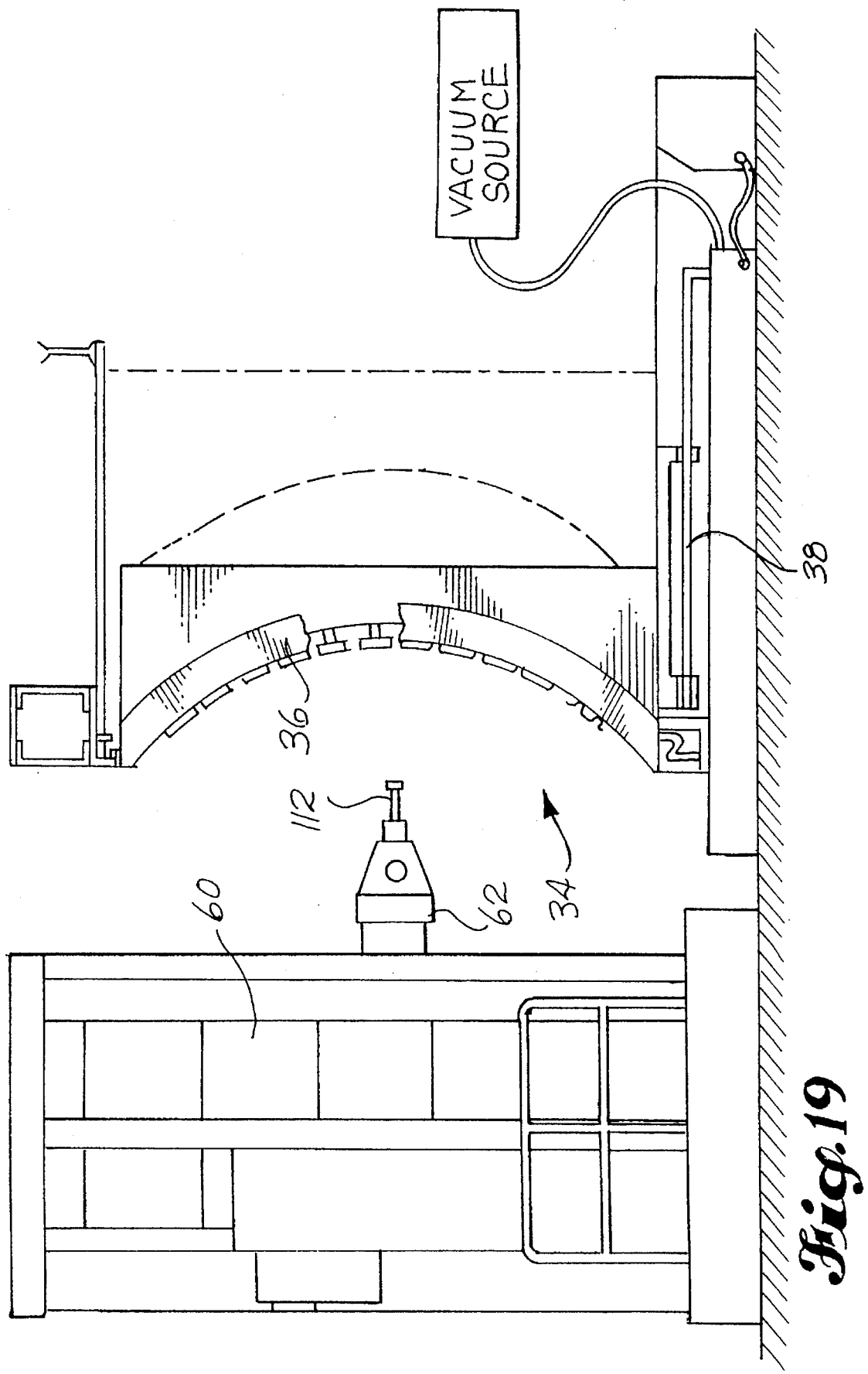

METHOD OF MAKING AIRPLANE FUSELAGE

This is a division of U.S. application Ser. No. 07/964,533 filed on Oct. 13, 1992, now U.S. Pat. No. 5,560,102, and entitled "Panel and Fuselage Assembly". This invention relates to a method an apparatus for manufacturing large mechanical structures, and more particularly to a method and apparatus for manufacturing panels and major airplane fuselage sections.

BACKGROUND OF THE INVENTION

Traditional manufacturing techniques for assembling components to produce large mechanical structures to a specified contour traditionally have relied on fixtured tooling techniques utilizing floor assembly jigs and templates to locate and temporarily fasten detailed structural parts together to locate the parts correctly relative to one another. This traditional tooling concept usually requires at least one primary assembly tool for each subassembly produced, and movement of the parts from tool to tool for manufacturing operations as they are built up. The tooling is intended to accurately reflect the original engineering design of the product, but there are many steps between the original design of the product and the final manufacture of the tool. It is not unusual that the tool as finally manufactured produces parts that are outside of the dimensional tolerances of the original part design, and, more seriously, the tool can become out of tolerance from typical hard use it receives in the factory. Moreover, dimensional variations caused by temperature changes in the factory can produce a variation in the final part dimensions as produced on the tool. Also, hand drilling of the part on the tool produce holes that are not perfectly round when the drill is presented to the part at a slightly nonperpendicular angle to the part, and also when the drill is plunged into the part with a motion that is not perfectly linear. Parts can shift out of their intended position when they are riveted in non-round holes, and the nonuniform hole-to-rivet interference in a non-round hole lacks the strength and fatigue durability of round holes. The tolerance buildup on the part as it is moved from tool to tool can result in significant deviation from the original design dimensions, particularly when the part is located on the tool at one end of the part, forseeing all of the part variation in one direction instead of centering it over the true intended position. Finally, this traditional hard tooling is expensive, difficult to change when design changes are implemented and takes up a large amount of factory floor space.

These disadvantages of the use of hard tooling are inherent in the concept and, although they can be minimized by rigorous quality control techniques, they will always be present to some extent in the manufacture of large mechanical structures using hard tooling.

SUMMARY OF THE INVENTION

Accordingly, it is an object of this invention to provide a method of manufacturing large mechanical structures which is independent of traditional hard tooling to determine the placement of the parts relative to one another and the part contour.

Another object of the invention is to provide a method of manufacturing large mechanical structures using intrinsic features of the part to allow them to self locate and determine part dimensions and part contours rather than using the traditional hard tooling concepts.

It is yet another object of this invention to provide a system for manufacturing large mechanical structures that is inherently more accurate than the prior art and produces structures in which the parts are consistently located on the structure within the tolerance specified by the engineering design.

It is yet another object of the invention to provide a system for manufacturing large mechanical structures that is faster and less expensive than the prior art traditional techniques and requires less factory space and is less dependent upon the skill of workers to produce parts within the engineering tolerances specified.

These and other objects of the invention are attained in a system using a method that utilizes spatial relationships between key features of detail parts or subassemblies as represented by coordination holes drilled into the parts and subassemblies by accurate numerically controlled machine tools using original numerical part definition records and making the parts and subassemblies intrinsically determinate of the dimensions and contour of the assembly.

DESCRIPTION OF THE DRAWINGS

The invention and its many attendant objects and advantages will become better understood upon reading the following detailed description of the preferred embodiment in conjunction with the following drawings, wherein:

FIG. 12 is a perspective view of a fixture holding a frame member for drilling of coordination holes by an NC machine tool;

FIG. 13 is a perspective view of an assembled quarter panel, showing the frame members installed in accordance with this invention;

FIG. 14 is an enlarged perspective view of a detail in FIG. 13, showing how the frame and stringer clip coordination holes are aligned;

FIG. 19 is an elevation of the fuselage panel assembly cell shown in FIG. 4, with a touch probe carried by the robot arm instead of a machining end effector.

DESCRIPTION OF THE PREFERRED EMBODIMENT

Figure 1:
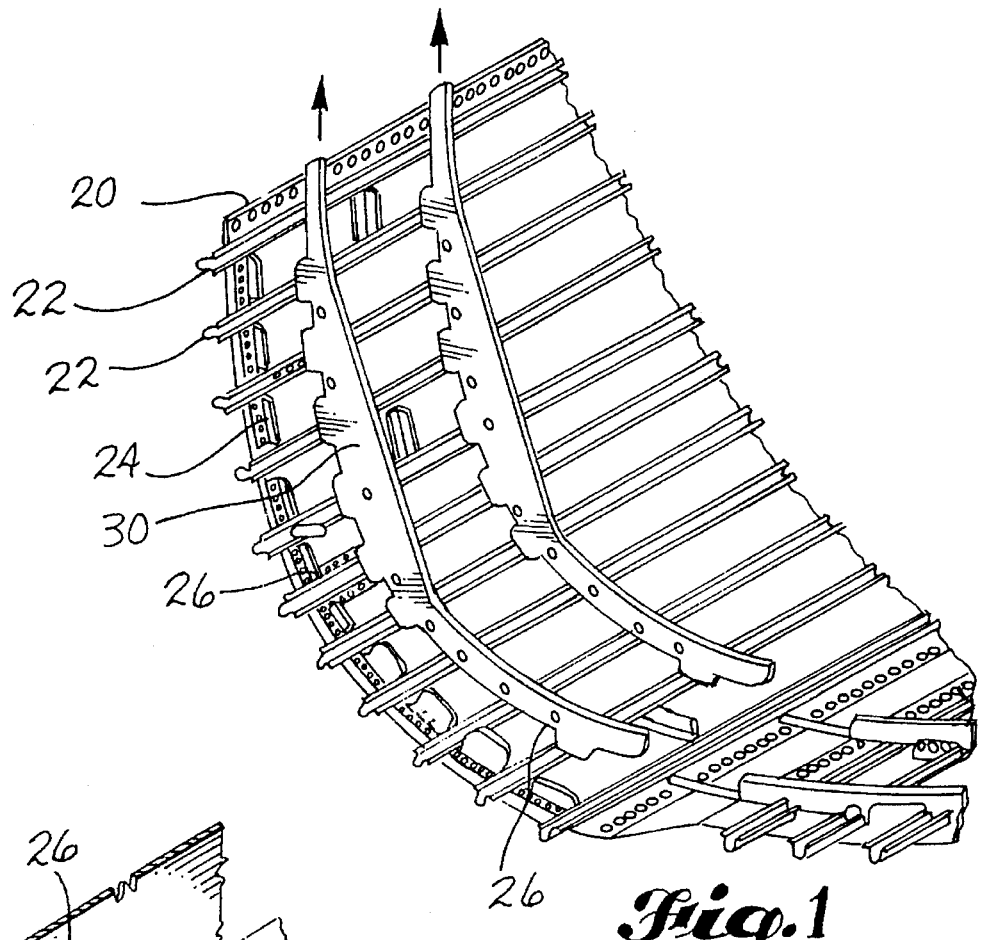
FIG. 1 is a partially exploded perspective view of a portion of an airplane fuselage constructed in accordance with this invention.
Figure 2:
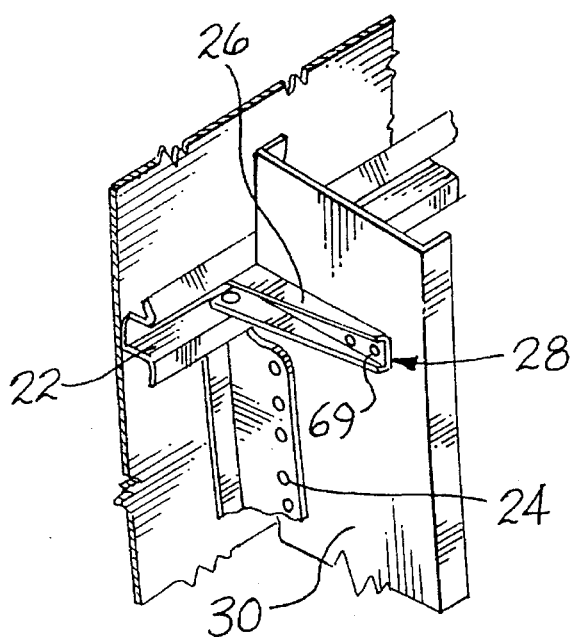
FIG. 2 is an enlarged view of a junction between a stringer, a shear tie, a stringer clip and a frame member in a fuselage section made in accordance with this invention.

Referring now to the drawings, wherein like reference characters designate identical or corresponding parts, and more particularly to FIG. 1 thereof, a portion of an airplane fuselage section is shown having a skin 20 unto which is fastened by riveting a plurality of parallel stringers 22 and a plurality of shear ties 24 along station planes perpendicular to the longitudinal axis of the fuselage. A plurality of stringer clips 26 are positioned in the channel of each stringer 22 and each stringer clip 26 has a flat surface 28 which is designed to lie on one of the same station planes on which the shear tie surfaces lie. A frame member 30 having a curved contour the same as the desired contour of the airplane fuselage is riveted to the shear ties and the stringer clips, as shown in FIG. 2.

To ensure that the faying surfaces of the shear ties 24 and the stringer clips 26 lie within the designated tolerance limits of 0.010" from their station planes, and that the alignment of the station planes between body panels, that is, the panel-to-panel indexing of station lines, is within tolerance limits, so that the frame members 30 may be fastened to the body panels and joined in alignment without the use of shims and without stressing the panel, the stringers 22, the shear ties 24 and the stringer clips 26 must be fastened to the fuselage skin 20 with extreme accuracy and consistency. The consistency enables the use of statistical process control to detect a trend toward an out of tolerance condition before bad parts are produced so that corrective action may be taken. Accuracy of parts manufacture insures that the airplane will come together perfectly with no prestressed parts and no cosmetic imperfections.

The object of this invention is to provide a method and apparatus usable in the airframe industry, as well as others, which enables the manufacturer of parts with such precision and consistency.

Figure 3:
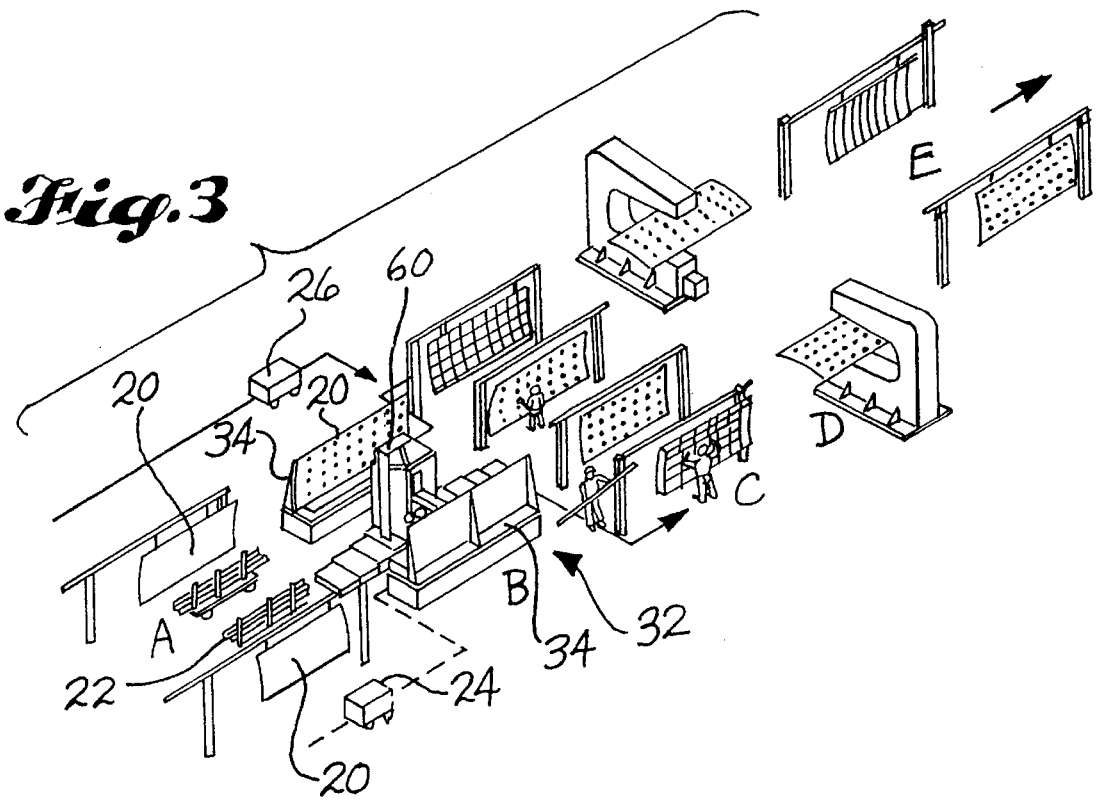
FIG. 3 is a schematic representation of a process for assembling panels in accordance with this invention.
Figure 5:
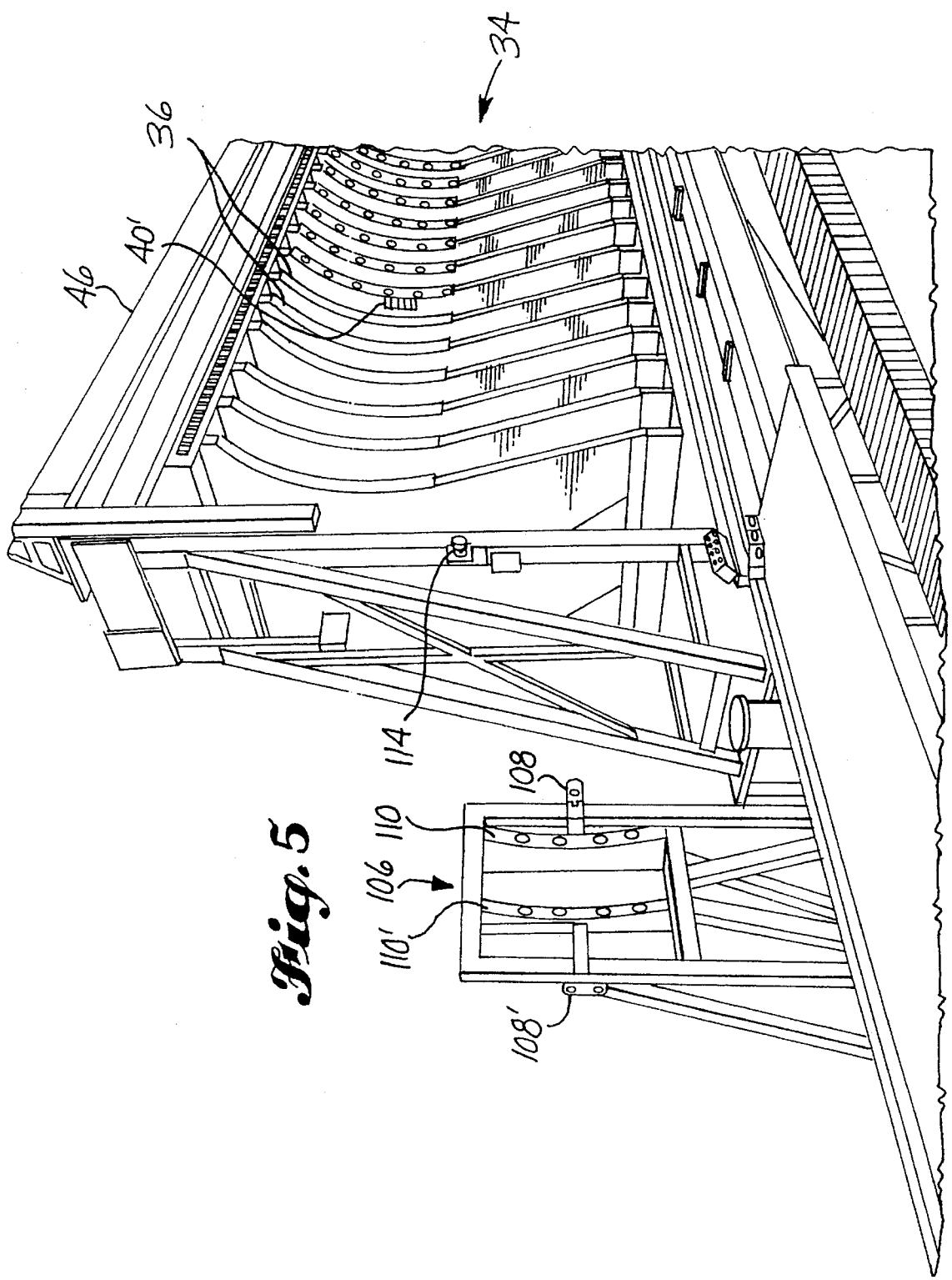
FIG. 5 is a perspective view of one end of a reconfigurable fixture shown in the cell of FIG. 4, and also showing a monument for checking the accuracy of the machine tool in the cell.

Turning now to FIG. 3, a schematic representation of the process for manufacturing panels is shown having five stations. In the first station, station A, fuselage skins 20, stringers 22, shear ties 24 and stringer clips 26 are brought to a fuselage assembly cell 32 at station B where the fuselage skins 20 are loaded on to a reconfigurable holding fixture 34 as disclosed in U.S. Pat. No. 5,249,785, the disclosure of which is incorporated herein by reference. The reconfigurable fixture 34 has a plurality of headers 36 which move laterally in the fixture on slides 38 to enable skins 20 of different contour to be mounted on the fixture 34. Two index devices 40 and 40' mount to the side of two of the headers 36 as shown in FIGS. 5 and 6.

Skins 20, which in the preferred embodiment are contoured, chemical milled aluminum aircraft skins, are brought from a skin storage area 42 via a trolley system 44 and are lifted on to the reconfigurable fixture 34 by an elevator 46 to which the trolley 44 is transferred. The skins 20 are lifted by the elevator 46 and positioned so that a pair of end tabs 48 and 48' are aligned with pins 50 on the index devices 40 and 40'.

Figure 6:
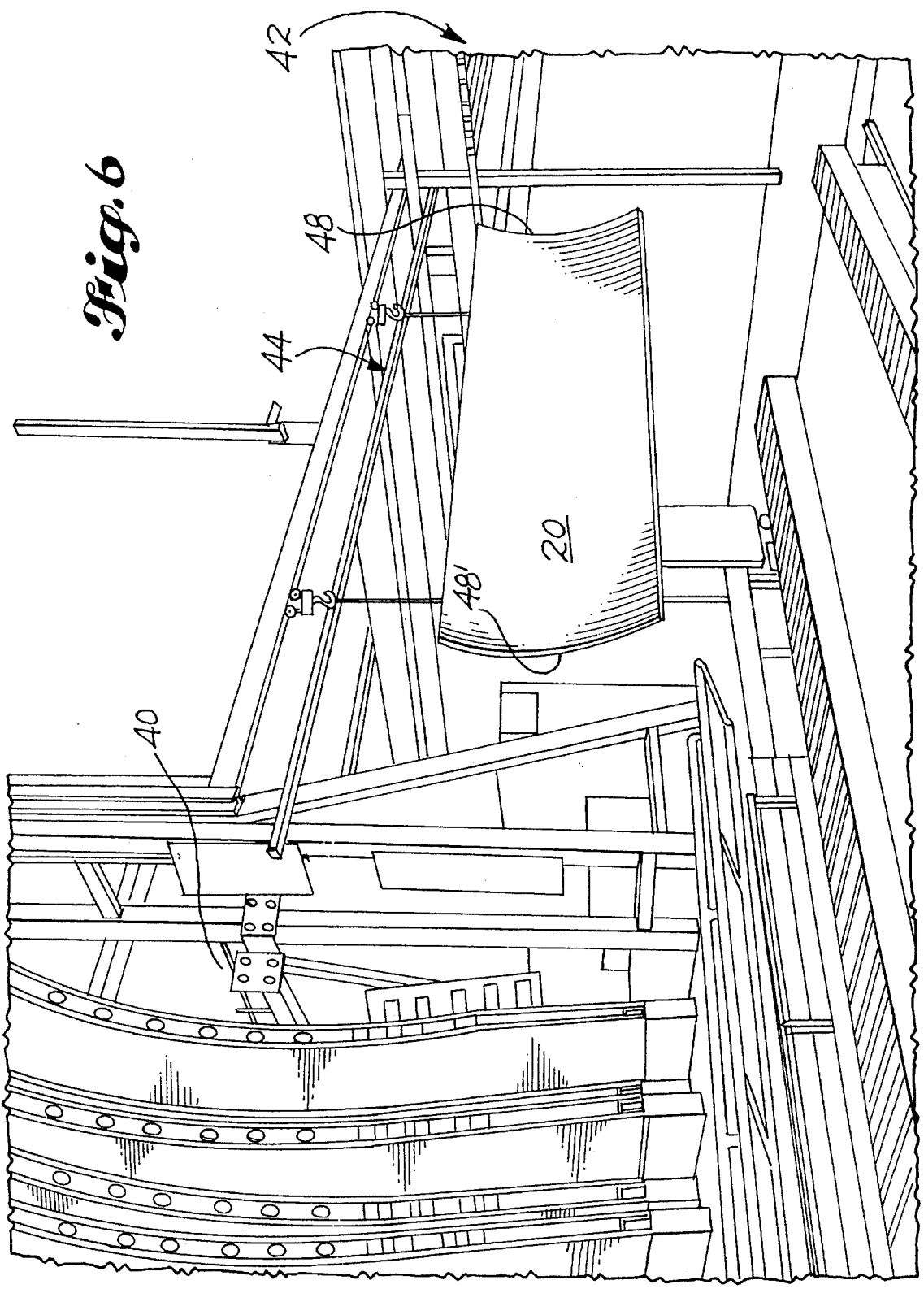
FIG. 6 is a perspective view of the other end of the reconfigurable fixture shown in FIG. 5 and showing the fuselage skin handling system.
Figure 7:
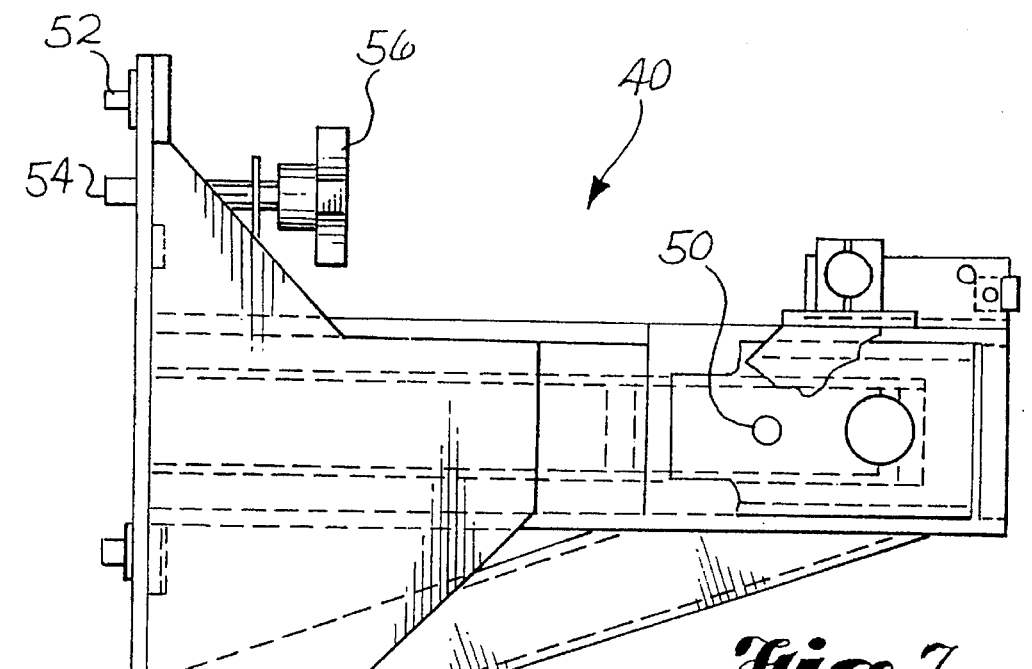
FIG. 7 is an elevation of an index device for positioning a fuselage skin on the reconfigurable fixture shown in FIGS. 5 and 6.

The index device shown in FIGS. 6 and 7, includes three precision ground alignment pins 52 which fit into precision ground bushings set into the headers 36. The index devices 40 are held in place by bolts 54 which can be hand tightened by star wheels 56. After the holes in the skin index tabs 48 have been placed over the pins 50 on the index devices 40 and 40', a slide 58 is slid over the skin index tabs 48 to hold the skin on the pin 50. Vacuum is applied to suction cups 59 on the headers 36 to hold the skin firmly against the headers 36, ready for machining operations.

Figure 4:
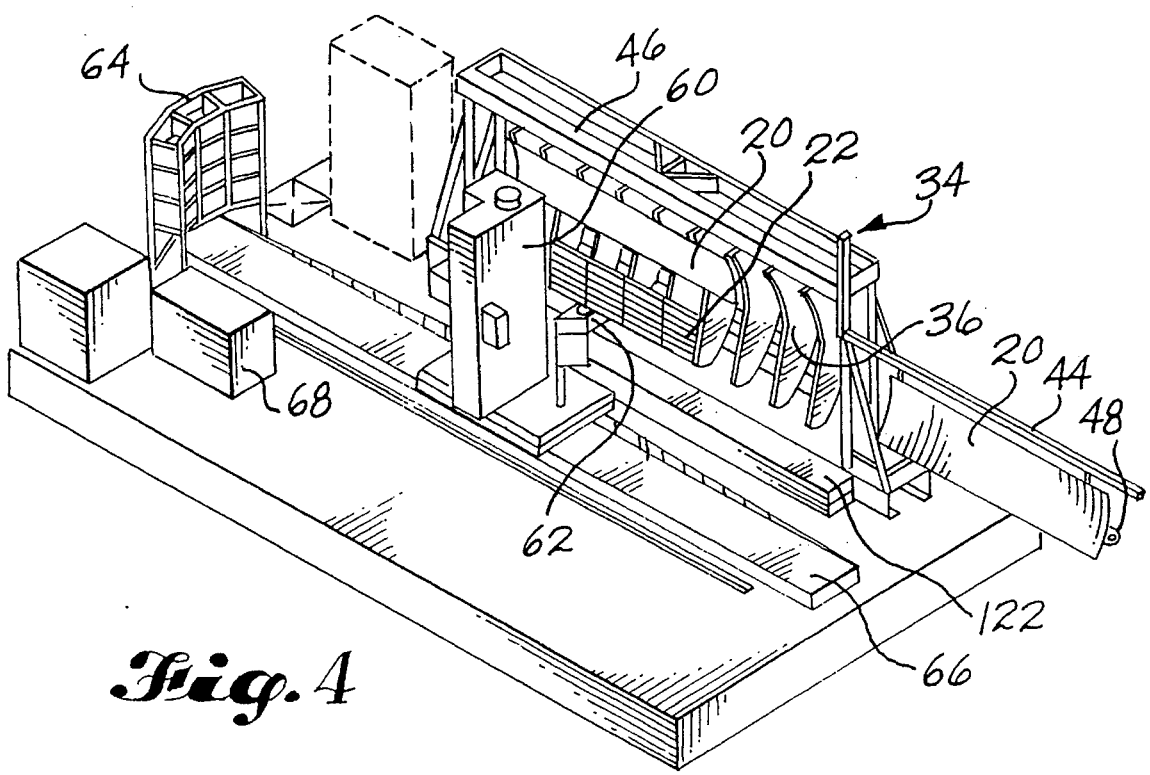
FIG. 4 is a fuselage panel assembly cell designated as station B in FIG. 3, with the left-hand bank omitted for clarity of illustration.

Looking back at FIGS. 3 and 4, a machine tool 60 is shown mounted between the two reconfigurable fixtures 34. In the preferred embodiment, the machine tool 60 is a CNC machine tool such as a Jo'Mach 16/3B produced by JOBS, that combines articulated movements with rigidity and accuracy of a conventional CNC machine tool. The machine tool 60 controls a robot arm 62 which operates any of a number of end effectors for performing machining operations on the skin 20. The end effectors are stored in a rack 64. Each end effector is supported on a clamp in its own cubicle in the rack 64 for security.

To pick up an end effector, the robot 60 rotates about a vertical axis and travels longitudinally along its support tracks concealed under a flexible track cover 66. The machine tool 60 inserts the end of the robot arm 62 into the receptacle in the end effector and a computer controller 68 directs the clamps in the cubicle to release the end effector to be picked up by the robot arm of the machine tool 60. The machine tool 60 carries the end effector back to the location of the skin 20 on the fixture 34 and commences machining operations on the skin.

The machining process after the skin 20 has been accurately located on the fixture 34, includes drilling coordination holes in the skin 20 and in the stringers 22 mounted below the skin on the fixture 34. A number of coordination holes are drilled, sufficient to accurately locate the stringer 22 on the skin 20 when the stringers are assembled to the skin at a separate station. A drilling and centering end effector (not shown) centers the channel of the stringer 22 on the end effector so that the hole drilled by the end effector is precisely in the center of the stringer channel.

After all of the stringers 22 have been drilled with coordination holes and corresponding coordination holes have been drilled in the skin 20, the shear ties 24 are drilled and coordination holes for the shear ties are drilled in the fuselage skin. For this purpose, an end effector is provided for picking up the shear ties 24, placing them against the fuselage skin 20 in the correct location, and drilling two coordination holes simultaneously through the flange of the shear tie 24 and the skin 20. The shear tie 24 is presented to the shear tie placement and drilling end effector by a parts presenter which centers the shear tie in a presentation location so that the shear tie is always presented to the robot at exactly the same position and orientation. In this way, when the end effector picks up the shear tie 24, it always picks it up at exactly the same position so that when it is presented to the skin 20, the ends of the shear tie are precisely positioned in accordance with the original design definition for the part.

The shear ties 24 are positioned one by one at their correct location on the skin 20 and then returned to a numbered storage tray having individual slots for each shear tie. In this way, it is possible to ensure that, when the panel is assembled, the correct parts are placed at the positions at which the coordination holes for those parts were drilled.

After the shear ties have all been positioned and drilled and returned to their storage tray, a stringer clip placement and drilling end effector is picked up by the robot arm 62 of the machine tool 60. The stringer clip placement and drilling end effector is disclosed in U.S. Pat. No. 5,127,139, the disclosure of which is incorporated herein by reference. The stringer clip placement and drilling end effector picks up the stringer clips 26 from the parts presenter, and places them at the correct location in the channel of the stringers 22. A clamp in the end effector squeezes the sides of the stringer against the stringer clip and a pair of opposed drills drills through the side of the stringer and through the side walls of the stringer clip 26. A coordination hole 69 is also drilled in the end of the stringer clip 26 at the same time for a purpose which will appear presently. The end effector then releases the stringer clip where it is held in the stringer 22 by the resilience of the stringer walls.

The final machining operation is an edge routing which is performed by a high speed routing end effector. The machine tool 60 returns the stringer clip placement and drilling end effector to its cubicle in the rack 64 and picks up the routing end effector. The machine tool 60 returns to its position opposite the fixture 34 and routes the edges of the fuselage skin 20 to the correct dimension specified by the original part definition data base by accurately locating the edges relative to the coordination holes in the skin. At the conclusion of the routing, the fuselage skin 20 conforms closely to the original engineering part definition. In practice, the tolerance has been in the order of less than 0.005" which, when the parts are assembled on the skin, produces a panel which can be assembled with extremely close conformance to the original product specification without the use of shims and without prestressing any of the parts.

The skin 20 and the stringers 22 are removed from the fixture 34 on the trolley 44 are deburred to remove burrs around the drilled coordination holes, and are carried to Station C in FIG. 3 which are simple hanging racks on which the skin 20 can be hung while the shear ties 24, which have also been deburred to remove burrs around the drilled coordination holes, and stringers 22 are sealed and tack fastened to the skin 20 through their aligned coordination holes. The assembled panel is now taken to an automatic riveting machine such as a Drivematic made by GEMCOR, the shear ties 24 and stringers 22 are clamped to the skin 20, and the shear ties and stringers are drilled and riveted to the skin.

Figure 10:
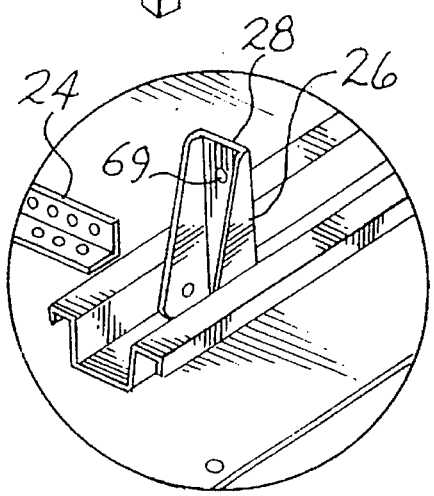
FIG. 10 is an enlarged detail of FIG. 9.
Figure 9:
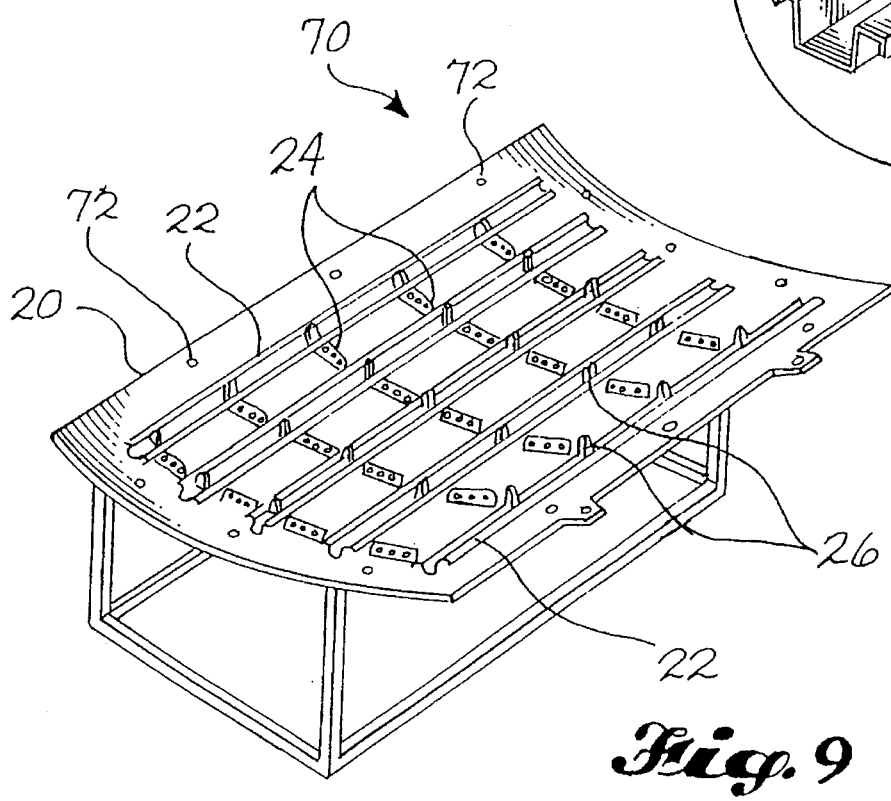
FIG. 9 is a perspective view of an assembled panel showing the coordination holes in the edges of the panel and in the stringer clips.

The panel 70 is next taken to Station E in FIG. 3 where the stringer clips 26 are inserted at the correct location and are held in place while additional holes are drilled and rivets are inserted and upset. This process can occur on a hanging rack as illustrated in FIG. 3 or on a work table as shown in FIG. 9. The stringer clip 26, shown in FIG. 10, is accurately positioned so that its faying surface 28 lines up exactly with the corresponding vertical surface on the flange of the shear tie 24 and both surfaces lie along the station plane around the fuselage as it will eventually exist from buildup of a plurality of panels 70.

While the skin 20 was on the fixture 34 a series of panel-to-panel coordination holes 72 was drilled along the edge of the skin 22. These panel-to-panel coordination holes 72 are now used to position the panels relative to each other on a fixture 74 shown in FIG. 11. The configuration of the fixture 74 is non-critical because the panels are still relatively flexible and the ultimate configuration of the fuselage will be determined, not by the tooling, but by the parts themselves, as will be described below.

The panels 70 are positioned on the fixture 71 and the coordination holes 72 are aligned on adjacent panels and sealant is applied between the facing surfaces of the panel edges. The panels are aligned so that the coordination holes 72 on adjacent panels line up exactly and the two panels are fastened together at their adjacent edges by temporary cleco fasteners through the coordination holes to insure that the panels are exactly aligned. The panels are then drilled and riveted to permanently fasten them together to form a super panel 74.

As shown in FIG. 12, an aircraft frame member 30 is mounted on a fixture 76 in opposition to a precision machine tool 78 for drilling of coordination holes in the frame member.

Figure 8:
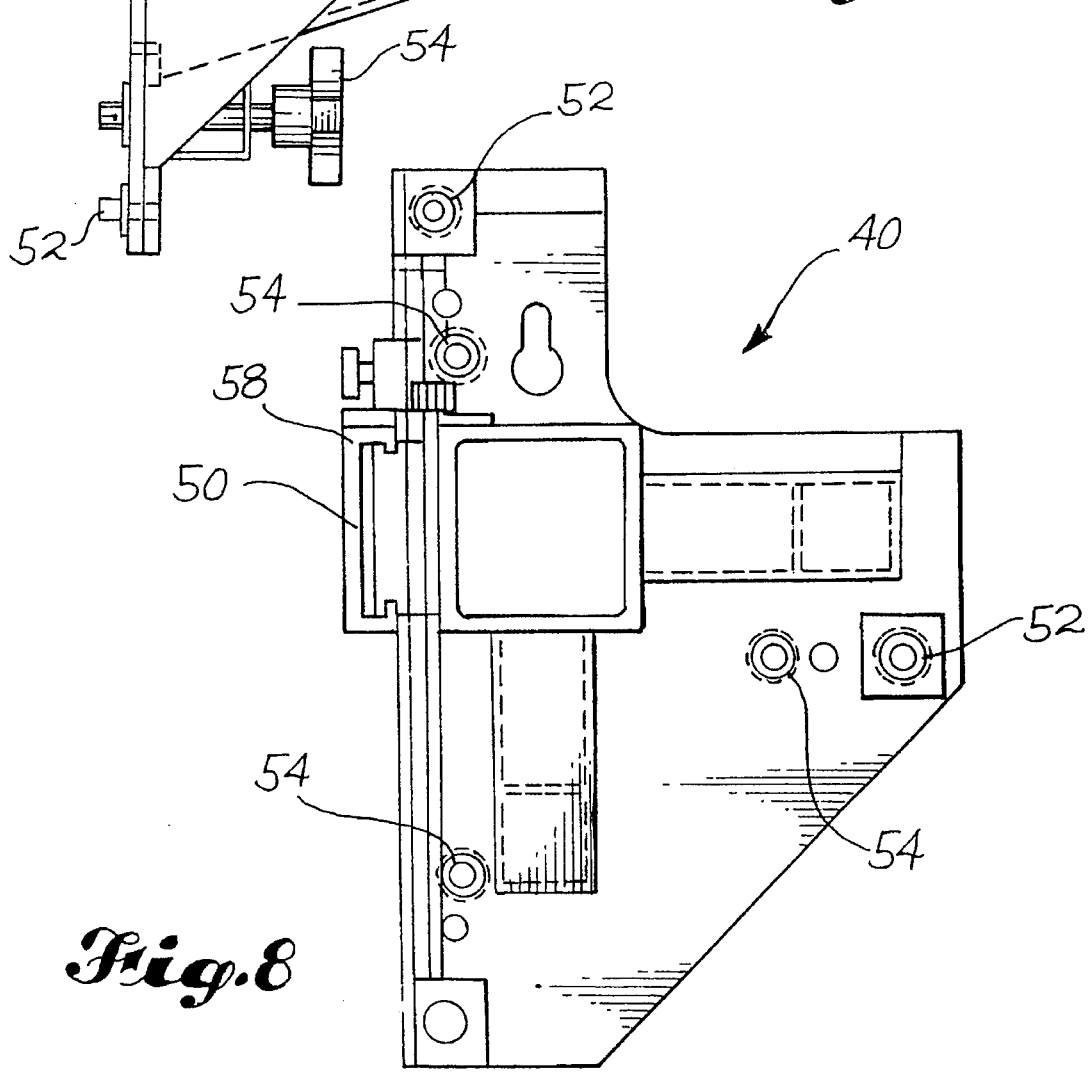
FIG. 8 is an end view of the index device shown in FIG. 7.

The frame is mounted on index pins on index devices 82 similar to that shown in FIG. 7 and 8 and the position of the index devices 82 is checked with the machine tool 78 as discussed below in connection with the checking of the machine tool 60. The position of the coordination holes is downloaded from the CAD/CAM main frame original engineering part definition records in the same manner that the machine tool 60 is controlled by original engineering data so that the coordination holes correspond to the original part definition rather than to an interpretation of that information as expressed in hard tooling. The coordination holes drilled in the frame member 30 include holes 80 for alignment of the frame to the coordination holes 69 in the stringer clips 26, holes 81 for alignment of the floor grid as will be described later, and holes 83 for alignment to the frame with stringer clips of the upper lobe of the fuselage, also to be described later.

Figure 11:
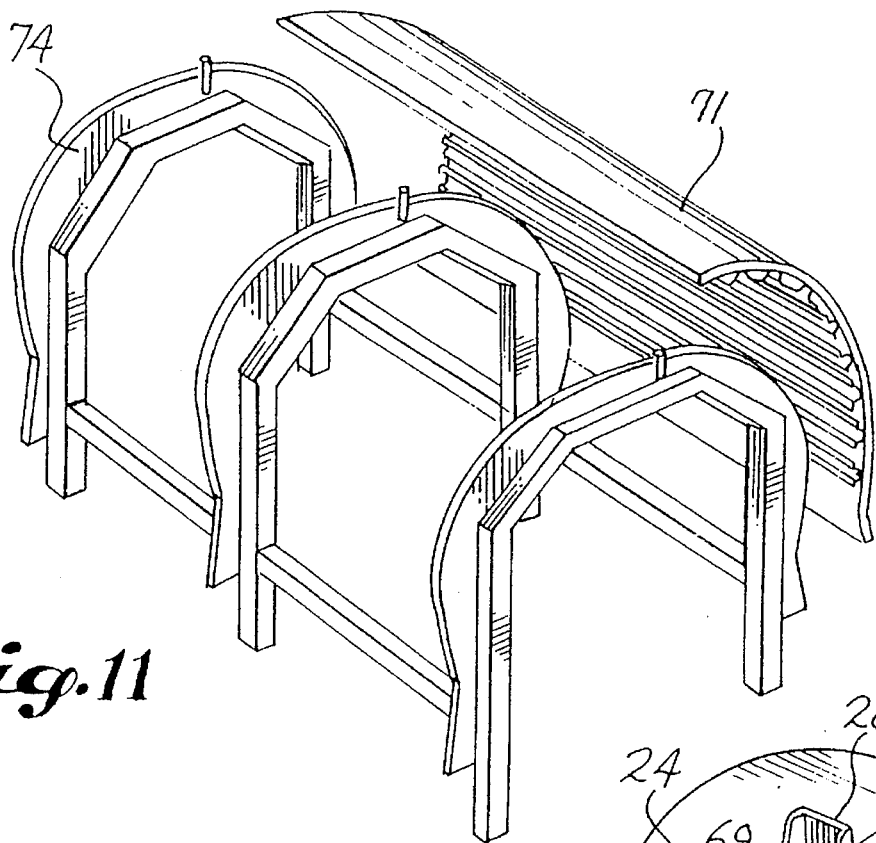
FIG. 11 is a perspective view of two panels being joined along one edge using the coordination holes to form a superpanel.

After the coordination holes are drilled in the frame 30, the frame is removed to the fixture 74 shown in FIG. 11 and fitted to the superpanel 71. The coordination holes 80 are aligned with the coordination holes 69 in the stringer clip 26 and are temporarily fastened through the aligned coordination holes with cleco fasteners. This alignment determines the outside contour of the superpanel skin so that the contour is independent of any hard tooling and instead is determined by the location of the coordination holes 80 in the frame which in turn was directly controlled by the original engineering part definition data as downloaded from the data in the CAD/CAM main frame.

When the frame members 30 are all clecoed into position through the aligned coordination holes 80 and 69 in the frame and stringer clips 26, the tabs 84 on the frame member 30 are clamped, drilled and riveted to secure the frame member 30 to the superpanel 71. The cleco fasteners are then removed one by one and replaced with permanent rivets to secure the stringer clips 26 to the frame member 30 to produce a fuselage quarter panel as shown in FIG. 13.

Figure 16:
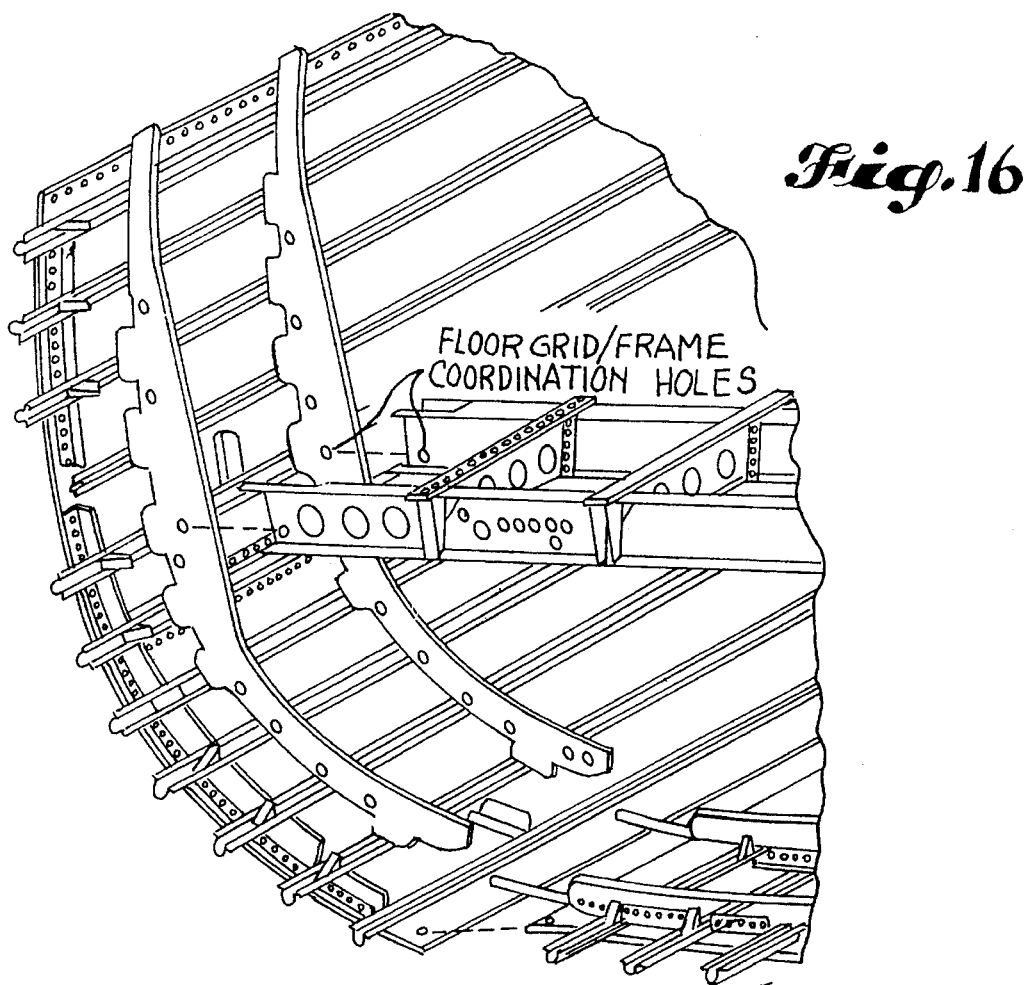
FIG. 16 is an exploded perspective view of a fuselage lower lobe showing the floor grid and frame connection, and also the frame and superpanel connection.
Figure 15:
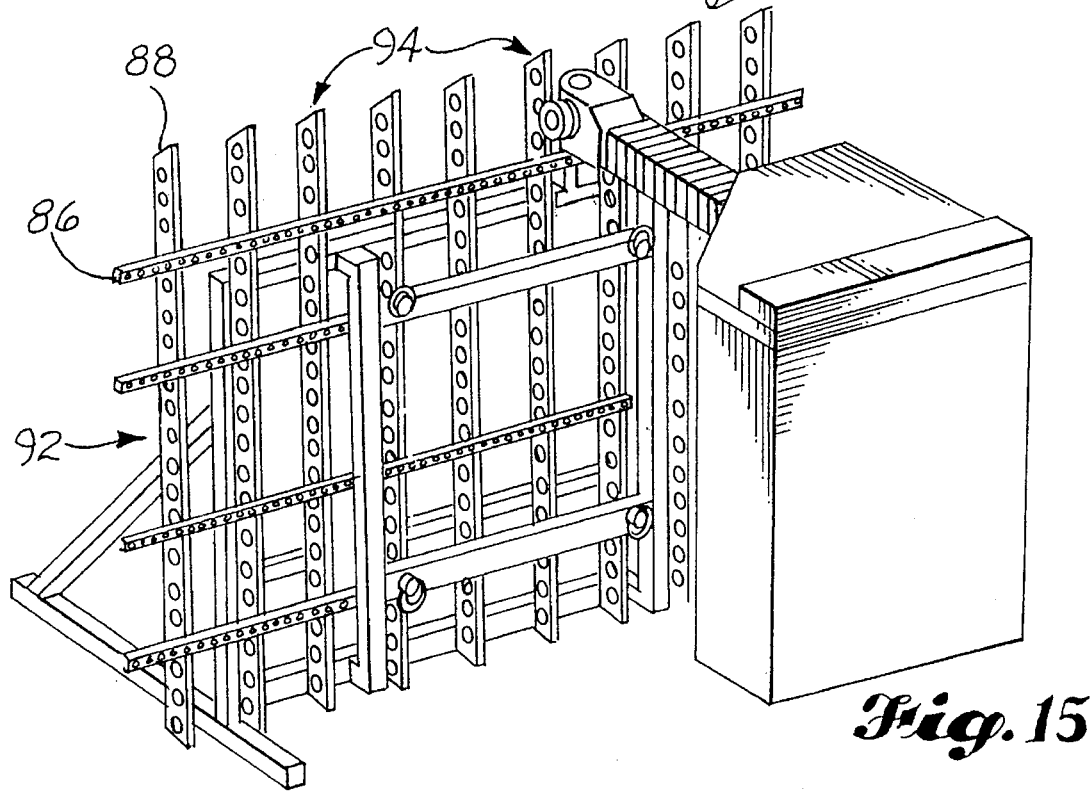
FIG. 15 is a perspective view of a floor grid held in a fixture while coordination holes are drilled in the ends of the cross members by an NC machine tool.
Figure 17:
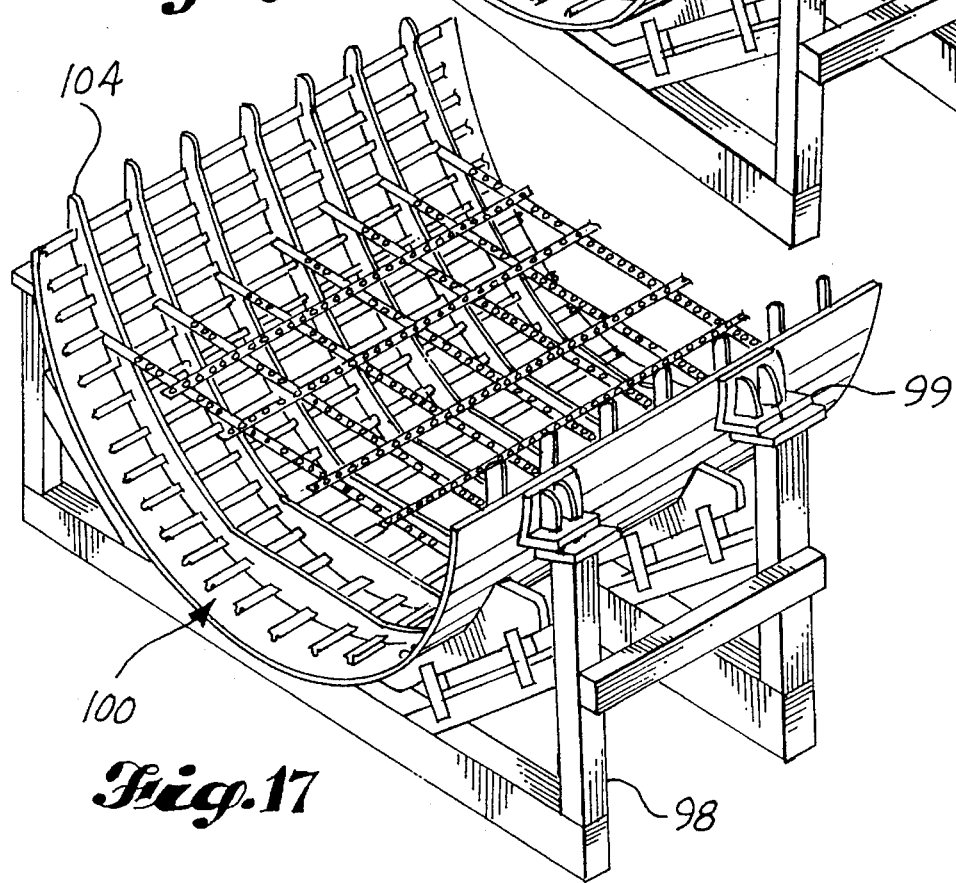
FIG. 17 is a perspective view of an assemble lower lobe in accordance with this invention.

Turning now to FIG. 15, a floor grid 90 made of series of longitudinal floor grid members 86 and cross floor grid members 88 is held in a fixture 92 while coordination holes 94 are drilled in the ends of the cross members 88. The floor grid 90 itself may be manufactured using the same determinant assembly concept of part manufacturing as disclosed herein for panel and fuselage manufacture. In this way, the longitudinal dimension between adjacent cross members 88 will correspond exactly to the longitudinal dimension between adjacent station planes, so that when floor grid is inserted in the fuselage between frame members, the frame members 30 will lie perfectly flush against the corresponding cross members 88 of the floor grid 90. When the coordination holes 94 have been drilled, the floor grid is hoisted by its support rack 96 into position in the assembled fuselage as shown in FIG. 16 and the coordination holes 81 drilled by the machine tool 78 are aligned with the coordination holes 94 in the ends of the cross members 88 of the floor grid 90. Temporary cleco fasteners are inserted through the aligned coordination holes to hold the floor grid in its correct position and the floor grid is then drilled and fastened into position in permanent assembly as shown in FIG. 17. The fixture 98 on which the fuselage lobe 100 is supported has a compliant support 99 which allows the fuselage to flex so that the alignment of the coordination holes 81 and 94 will determine the cross dimension of the fuselage lobe 100. Thus, the fixture 98 does not determine the fuselage contour, but rather the dimensions of the coordination holes drilled into the floor grid 90 determines the cross dimension across the fuselage.

Figure 18:
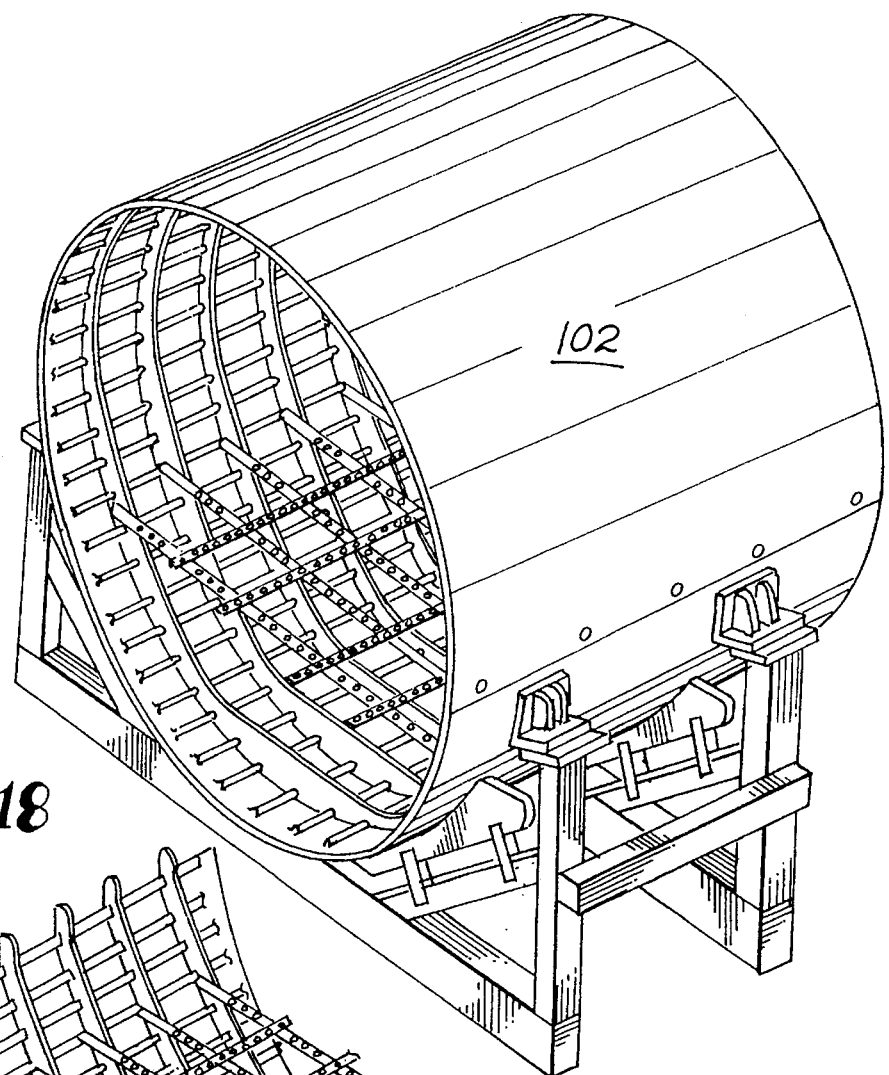
FIG. 18 is a perspective view of a completely assemble fuselage section according to this invention.

After all of the floor grid cross members 88 are fastened into place on the frame members 30, an upper fuselage lobe 102, also made in accordance with the determinate assembly technique described herein, is hoisted into place over the lower lobe 100 and coordination holes on the edges of the panels which make up the upper lobe are aligned with the holes in the panels which make up the lower lobe. Temporary cleco fasteners are inserted through the aligned holes to hold the upper lobe in place on the lower lobe. Coordination holes 83 in the protruding ends 104 of the frame members are aligned with the corresponding stringer clips 26 in the upper lobe and are temporarily fastened with clecos through the aligned coordination holes. Once the frame members and lobe skin coordination holes rate all aligned and temporarily fastened, the entire assembly is sealed, clamped, drilled and riveted to form the final fuselage section as shown in FIG. 18.

Turning now back to FIG. 5 and 6, the fuselage assembly cell 32 includes a monument 106 on which a pair of index devices 108 and 108' are mounted. The monument 106 can include a pair of fixed headers 110 and 110' on which a test coupon can be mounted by way of index tabs which fit into the index devices 108 and 108' in the same way that the skin tabs 48 fit in the index device 40. The purpose of the test coupon is to provide a test article that can be manufactured and accurately measured in a convenient manner to provide assurance to the factory manager that the system is producing accurate parts.

A more important function of the monument is its role in an indexing system which is used each time a new operator assumes control over the fuselage assembly cell 32 from the previous operator at shift change or the like. The new operator initiates a command which instructs the machine tool 60 to pick up a touch probe 112 and commence a probing routine. The touch probe 112 can detect contact in the Z direction, that is the direction of its length, and in both orthoginal directions perpendicular to its length. This enables the touch probe 112 to measure the distance from the machine tool to a contact point on the reconfigurable fixture 34 and also vertically and horizontally facing surfaces on the reconfigurable fixture. The probe routine executed by the robot arm first probes a pair of datum rings in the index devices 108 and 108' attached to the monument 106 to determine any temperature induced changes between the two datum rings. A compensation factor is introduced by the machine controller 68 to compensate for dimensional changes introduced by temperature deviations from the norm.

The touch probe 112 is guided by a custom program residing in the machine controller 68 to determine the location of the skin indexes 40 and 40' mounted on the headers 36 of the reconfigurable fixture 34. The measured location is compared with the theoretical location and the machine controller 68 halts the operation if the actual location differs from the theoretical location by more than the specified tolerance.

A stationary probe 114 is mounted on one of the frame members of the reconfigurable fixture 34. The stationery touch probe 114 is used to perform a functional check of the end effectors by presenting the end effectors to the stationery probe 114 to check for proper alignment and part pickup. The robot arm 62 operating under a check routine, presents the end effector anvils to the stationery touch probe 114 and compares the measured results with the theoretical data as stored in the machine controller 68. If there is a deviation by more than the specified tolerance limits, the end effector may be replaced with a spare end effector of the same type or the machine operation can be terminated while an accuracy audit is conducted.

The spindle mounted probe 112 is used to determine the location of point positions along the curved surface of the headers 36. These point locations are transferred to the machine controller 68 for comparison with theoretical data to confirm that the sheet loaded on the fixture 34 corresponds with the dataset loaded into the machine controller, and corrective action is taken if deviations are noted. For example, an offset amount may be established by which the data for the stringers, stringer clips, and shear ties can be offset when drilling and routing the sheet.

Figure 20:
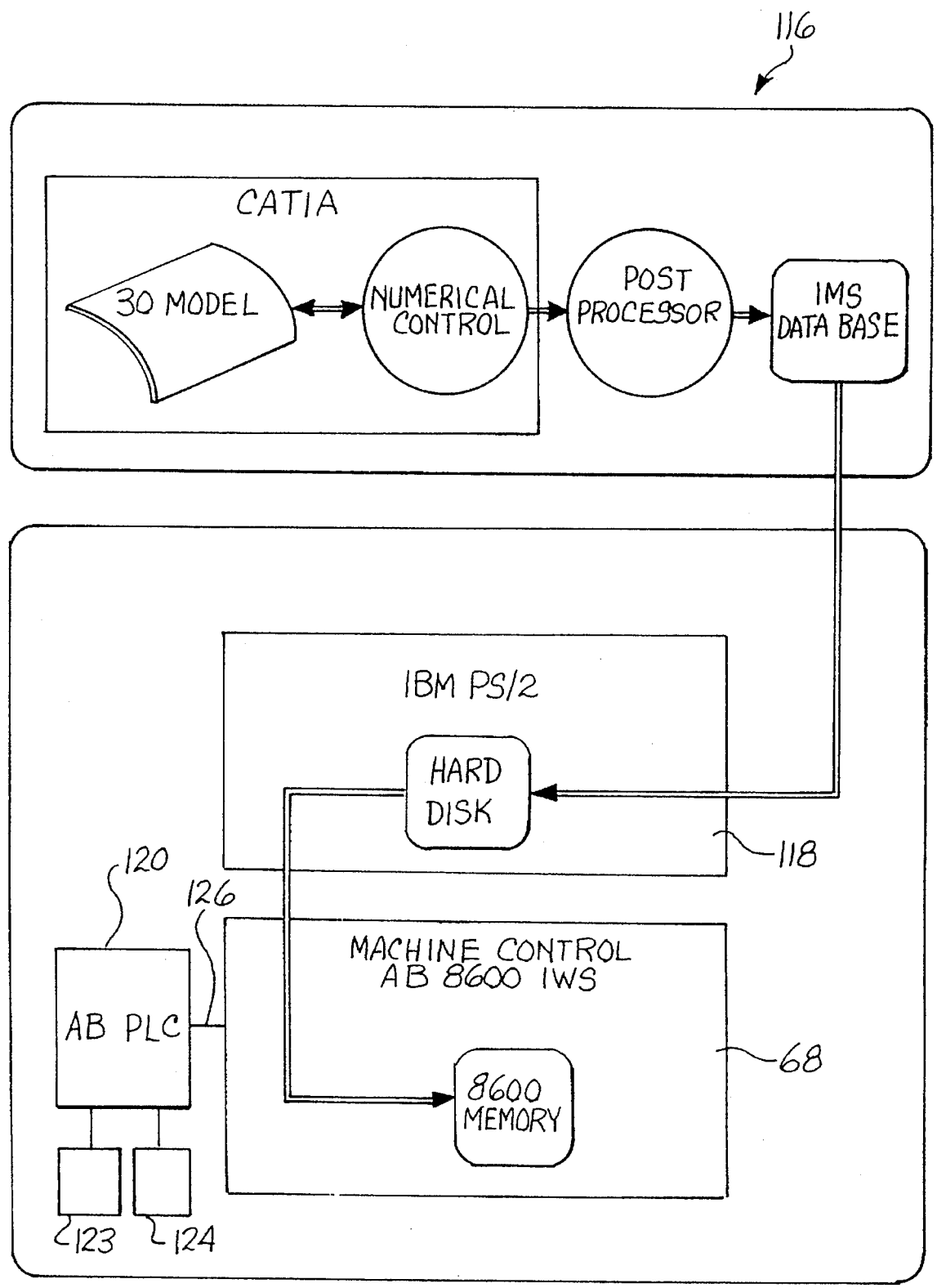
FIG. 20 is a schematic representation of the computer architecture that controls the fuselage panel assembly cell shown in FIG. 4.

Turning now to FIG. 20, the computing architecture for control of the fuselage assembly cell 32 is shown schematically to include computer functions which are performed by the CAD/CAM main frame 116 where the original engineering digital product definition is recorded and available as the ultimate product definition authority. A numerical control converts this data into a form that is usable by the post processor, which converts the digital parts definition data into motion commands for the robot arm 62 when carrying the appropriate end effector with the appropriate cutter. The IMS Database is a large capacity storage bank for storing all the parts programs that will be used by the assembly cell.

The other computing functions are performed at computer hardware stations in the fuselage assembly cell 32 and for convenience are performed by several separate computer hardware units, an IBM PS/2 118, the machine controller 68 which in the case of the preferred embodiment is an Allen Bradley 8600 IWS, and three Allen Bradley PLC's. One PLC 120 controls the clamps in the end effector storage rack 64, and the other two PLC's 123 and 124 control the reconfigurable fixtures and man lifts on the right and left banks of the assembly cell 32, respectively. All three PLC's communicate with the 8600 via a remote i/o line 126. The man lifts are personnel platforms 122 for raising workers up to the elevation of the skin index devices 40 when the skins are to be mounted on the reconfigurable fixture 34.

A system is thus disclosed which is usable for assembling parts on a skin to produce an accurate fuselage panel, and a system is disclosed for assembling panels so assembled into a full airplane fuselage. The determinant assembly concept embodied in this disclosure utilizes the spatial relationships between key features of detail parts and subassemblies, as defined in the digital design and represented by coordination holes put into the parts and subassemblies by a numerically driven tool controlled by original part design data, to control the relative location of detail parts in subassemblies, and the relative relationship of subassemblies to each other, making the parts self locating. This concept eliminates the need for traditional hard tooling used for decades in the air frame industry and for the first time enables assembly of large mechanical structures wherein the contour of the structure and the relative dimensions within the structure are determined by the parts themselves rather than the tooling.

Obviously, numerous modifications and variations of the system disclosed herein will occur to those skilled in the art in view of this disclosure. Therefore, it is expressly to be understood that these modifications and variations, and the equivalents thereof, may be practiced while remaining within the spirit and scope of the invention as defined in the following claims.

Wherein we claim:

1. A method of making an airplane fuselage section from a plurality of individual subassemblies including panels, frame members and a floor grid, comprising:

drilling coordination holes in the marginal regions of said panels said panels each including longitudinal stiffening stringers, stringer clips, and shear ties fastened thereto;

aligning said coordination holes in adjacent edges of a plurality of panels;

fastening said panels together temporarily with temporary fasteners through said aligned coordination holes;

clamping said panels together along said adjacent edges;

drilling holes in said adjacent edges of said panels with a single drill plunge for each hole during said clamping of said panels:

riveting said panels together along said adjacent edges through the drilled holes during said clamping of said panels to produce a superpanel;

drilling a coordination hole in each of said stringer clips of said superpanel and corresponding coordination holes in said frame members;

orienting said frame members on station planes adjacent corresponding stringer clips;

aligning said coordination holes in said stringer clips with said corresponding coordination holes in said frame members;

fastening said frame members to said stringer clips temporarily with temporary fasteners through their aligned coordination holes;

clamping said frame members to said stringer clips and to said shear ties fastened to said superpanel and extending between said stiffening stringers along said station planes;

drilling holes in said frame members and their corresponding stringer clips with a single drill plunge for each hole during said clamping of said frame members:

riveting said frame members and their corresponding stringer clips together through the drilled holes during said clamping of said frame members:

drilling holes in said frame members and corresponding shear ties with a single drill plunge for each hole during said clamping of said frame members:

riveting said frame members and their corresponding shear ties together through the drilled holes during said clamping of said frame members:

drilling a coordination hole adjacent each end of a plurality of cross members of said floor grid, and corresponding coordination holes in said frame members at each location therealong at which it is desired to connect said floor grid to said frame members;

orienting said floor grid adjacent said frame members and aligning said coordination holes in said cross members of said floor grid with said corresponding coordination holes in said frame members:

fastening said cross members to said frame members temporarily with temporary fasteners through their aligned coordination holes;

clamping said floor grid cross members to said frame members;

drilling holes in said cross members and said frame members with a single drill plunge for each hole during said clamping of said cross members:

fastening said cross members and said frame members together through the drilled holes during said clamping of said cross members to form a fuselage lower lobe:

drilling coordination holes along two longitudinally extending edges of said fuselage lower lobe, and along two corresponding longitudinally extending edges on a fuselage upper lobe;

orienting said fuselage upper lobe over said fuselage lower lobe and aligning said coordination holes along said longitudinally extending edges of said fuselage upper lobe with said corresponding coordination holes along said longitudinally extending edges of said fuselage lower lobe;

sealing and temporarily fastening said upper lobe and said lower lobe with temporary fasteners along said longitudinally extending edges through their aligned coordination holes;

clamping said fuselage upper and lower lobes together along said longitudinally extending edges;

drilling holes in said fuselage upper and lower lobes with a single drill plunge for each hole along said longitudinally extending edges during said clamping of said fuselage upper and lower lobes; and fastening said fuselage upper and lower lobes together through the drilled holes along said longitudinally extending edges to form a fuselage section;

wherein said drilling of said coordination holes in said panels, in said stringer clips, in said shear ties, in said frame members, in said cross members of said floor grid, and in said fuselage lower and upper lobe is done using an end effector carried by a precision computer controlled robot that is directed to the drilling locations using a digital data set taken directly from digital engineering part definition records, said drilling locations being determined with respect to reference points on each drilled component, so the spatial relationships between key features of said subassemblies as defined by said coordination holes make said subassemblies self-locating and intrinsically determinate of the final contour and configuration of said fuselage section, independent of tooling.

2. A method of making an airplane fuselage section as defined in claim 1, wherein each of said panels is formed by drilling coordination holes in a plurality of longitudinal stiffening stringers, stringer clips, and shear ties, and corresponding coordination holes in an aircraft skin, and using said coordination holes to align said longitudinal stiffening stringers, stringer clips, shear ties, and aircraft skin for subsequent clamping, drilling, and riveting operations;

said drilling of coordination holes in said longitudinal stiffening stringers, stringer clips, shear ties, and aircraft skin being performed as part of the same series of operations on a single holding fixture.

3. A method of making an airplane fuselage section as defined in claim 1, further comprising:

checking the accuracy of said robot by probing a monument of known dimensions and location to compare predicted dimensions and location with the dimensions and location as actually measured by said robot.

\* \* \* \* \*